(12) United States Patent
Faichney et al.

(10) Patent No.: US 6,980,482 B2
(45) Date of Patent: Dec. 27, 2005

(54) SEISMIC SURVEY SYSTEM

(76) Inventors: Alan Faichney, Swanston Old Farmhouse, Swanston Road, Edinburgh (GB) EH10 7DS; Keith Watt, 5 Upper Broomieknowe, Lasswade (GB) EH18 KP; Erik Hupkens, 140/7 Broughton Road, Edinburgh (GB) EH7 4LG ( * ) Notice: Subject to any disclaimer, the term of this patent is extended or adjusted under 35 U.S.C. 154(b) by 183 days.

(21) Appl. No.: 10/311,905

(22) PCT Filed: Jun. 18, 2001

(86) PCT No.: PCT/GB01/02671

§ 371 (c)(1),
(2), (4) Date: Jun. 18, 2003

(87) PCT Pub. No.: WO01/98798

PCT Pub. Date: Dec. 27, 2001

(65) Prior Publication Data

US 2004/0022127 A1 Feb. 5, 2004

(30) Foreign Application Priority Data

Jun. 22, 2000 (GB) .................................. 0015157

(51) Int. Cl.$^7$ .............................................. G01V 1/28
(52) U.S. Cl. ............................. 367/73; 367/38; 702/14
(58) Field of Search ...................... 367/38, 73; 702/14

(56) References Cited

U.S. PATENT DOCUMENTS

| 4,415,999 A | | 11/1983 | Moeckel et al. | |
| 4,679,174 A | | 7/1987 | Gelfand | |
| 4,982,382 A | * | 1/1991 | Dablain | 367/73 |
| 5,081,611 A | | 1/1992 | Hornby | |
| 5,081,612 A | * | 1/1992 | Scott et al. | 367/73 |
| 5,095,466 A | | 3/1992 | Julien et al. | |
| 6,169,959 B1 | * | 1/2001 | Dragoset, Jr. | 367/73 |

OTHER PUBLICATIONS

Zelt, C.A., "Lateral velocity resolution from three-dimensional seismic refraction data", *Geophys. J. Int.* 135: 1101-1112 (1998).

* cited by examiner

*Primary Examiner*—Ian J. Lobo
(74) *Attorney, Agent, or Firm*—Drinker Biddle & Reath LLP

(57) ABSTRACT

A method of analyzing seismic survey data in which a transfer function for a geological model is derived by ray tracing techniques applied to theoretical data and the transfer function is applied to actual survey data in order to calculate reflection points (50) and/or other attributes for each shot (42)/receiver (44) pair. The number of ray tracing calculations which have to be performed in deriving the model transfer function can thus be controlled. A sufficiently accurate transfer function can be derived using theoretical data representing substantially fewer shot (42)/receiver (44) pairs than are used in the traditional ray tracing solution applied directly to actual survey data. Attribute values for actual source (42)/receiver (44) pairs are estimated by interpolating the transfer function data.

14 Claims, 2 Drawing Sheets

SEISMIC SURVEY SYSTEM

FIELD OF THE INVENTION

The present invention relates to seismic survey systems and methods of analysing seismic survey data.

BACKGROUND OF THE INVENTION

During seismic survey operations, a source of energy is fired into the ground by a source at a particular location, a single instance of this being known as a "shot". The energy propagates as a pressure wave and shear wave through the ground and is reflected from structures in the underlying geology. The reflected return energy is measured by an array of sensors ("receivers") deployed at known positions. The collected measurements of return energy are referred to hereinafter as "data". The process is repeated over some form of regular grid 10 (see FIG. 1 of the accompanying drawings), each cell 12 of the grid being known as a "bin". For each shot/receiver pair, the data from the receiver is used to calculate a corresponding subsurface position ("reflection point") between the shot location and the receiver position, from which the shot energy is deemed to have been reflected. The calculated reflection points associated with the data are mapped over the survey area to produce a plot known as a coverage map. This map is used to identify areas that are less well covered by data and which require more shots in order to acquire further data. Accordingly, this may have a major impact on the overall cost of the survey.

As is also shown in FIG. 1, the intended shot locations for a particular survey operation are arranged along survey lines 14. Generally speaking, analysis of initial survey data will reveal faults, gaps etc. in this primary data, and additional shots will be required, arranged along "infill" lines 16.

The present invention is concerned with the problem of calculating the reflection points and/or other attributes used to map the data. In the simplest case (referring now to FIG. 2), the reflection point may be assumed to be at the mid-point 18 between the shot source 20 and the receiver 22. This has the advantage of speed and simplicity, but is necessarily only a crude approximation, taking no account of the underlying geology, typically comprising a number of layers 24, 26, 28 having differing properties, which affects the propagation paths between the shot location 20 and the receiver positions 22. Consequently, this method generally results in too much data being mapped in some areas and too little in other areas. Nevertheless, for a number of practical reasons, this is the primary method currently employed in the industry.

A more accurate estimate of the reflection point can be obtained by calculating the propagation paths 30, and hence the reflection point 32, on the basis of existing knowledge of the subsurface geology, as is also illustrated in FIG. 2. In principal, this approach ("ray tracing") allows the reflection point 32 to be calculated with a high degree of precision. However, a significant problem with this approach is that the starting angle ($\alpha$) of a particular ray originating at the shot location 20 which will cause the ray to emerge at the receiver position 22 is unknown. FIG. 2 shows a simplified example in only two dimensions, showing only the vertical offset angle ($\alpha$). In practice it is also necessary to take account of the horizontal azimuth angle ($\beta$). The problem becomes more complicated and time consuming with complex three-dimensional geologies.

The standard solution for ray tracing methods of this type is, for each shot/receiver pair, to iterate through many possible starting angles until a result is obtained which is close to the receiver position (within pre-defined tolerances). This standard approach is extremely inefficient, requiring many calculations to be performed and discarded before a useful result is obtained. The approach has two basic problems:

A. The number of computations required is the product of the number of shots, the number of receivers and the number of iterations. Given that a typical survey will involve 50–1000 million shot/receiver pairs, it is extremely important that the number of iterations is kept as low as possible. There are a number of techniques which allow the starting angle ($\alpha$) to be estimated, allowing the number of iterations to be minimised. Even in the simplest case (given a single flat layer; i.e. the mid-point reflection case), however, this still requires a number of computations equal to the product of the number of shots and the number of receivers.

B. This technique also makes the assumption that each shot/receiver pair has a unique solution, and that the level of detail (and hence the number of calculations required) is governed only by the density of shot/receiver pairs and not by the resolution of the geological model.

The present invention seeks to provide improved seismic survey systems and methods of analysing seismic survey data which obviate or mitigate the aforesaid disadvantages.

The present invention is based on two assumptions:

firstly, that any geological model employed for the purpose of analysing seismic survey data will have a fixed and predictable effect on the data, and that this effect can be described by a transfer function which may be determined by ray tracing techniques applied to a relatively small set of hypothetical shot/receiver locations; and secondly, that once the transfer function of the model is known, the transfer function can be applied to the actual shot/receiver pair data in order to determine the reflection points and/or other attributes to an acceptable degree of accuracy with no or minimal additional ray tracing (in areas where the geology is changing rapidly, some additional ray tracing may be required during the calculation of the transfer function, which may be performed automatically).

The preferred embodiments of the invention involve a two stage process in which a transfer function for a geological model is derived by ray tracing techniques applied to theoretical data and the transfer function is applied to actual survey data in order to calculate reflection points and/or other attributes for each shot/receiver pair. The number of ray tracing calculations which have to be performed in deriving the model transfer function can thus be controlled. It has been found that a sufficiently accurate transfer function can be derived using theoretical data representing substantially fewer shot/receiver pairs than are used in the traditional ray tracing solution applied directly to actual survey data.

In accordance with a first aspect of the present invention, there is provided a method of analysing seismic survey data, comprising:

(a) obtaining a numerical model describing the geology of a survey area;

(b) calculating a transfer function for said model which defines at least one attribute value within said survey area for a set of hypothetical shot source locations and corresponding receiver locations;

(c) comparing a set of actual survey data comprising a plurality of source/receiver pairs with said set of hypothetical source locations and receiver locations, and estimating at least one actual attribute value for each of said source/receiver pairs on the basis of said comparison.

Preferably, the step (b) includes:

(d) selecting a set of initial points within said survey area and selecting at least one hypothetical source location and a corresponding hypothetical receiver location centred on each of said points;

(e) for each of said source locations, calculating the path of a ray through said model originating at said source location and having an initial direction towards said initial point so as to determine a reflection point and an emergence point for said ray.

Preferably, the step of calculating said transfer function further includes:

(f) for each of said source locations, calculating a distance D1 between said initial point and said reflection point, a distance D2 between said hypothetical receiver location and said emergence point, a mid-point between said hypothetical shot location and said emergence point, and a distance D3 between said mid-point and said initial point;

(g) where said distance D2 exceeds a predetermined minimum value, selecting a second hypothetical receiver location on the basis of said distance D3 and repeating steps (e) and (f) for said second hypothetical receiver location.

Preferably:

(h) where a new value of D3 calculated in step (g) remains greater than said predetermined minimum value, the method includes performing further iterations of step (g) in which further hypothetical receiver locations are selected based on a weighted average of the distance D3 obtained in previous iterations until a value of distance D3 is obtained which does not exceed said predetermined value.

Preferably, the method further includes:

(i) dividing said survey area into a plurality of first blocks, said initial points selected in step (c) comprising central points of said first blocks.

Preferably, the method further includes:

(j) sub-dividing each of said first blocks into a plurality of second blocks, selecting a second set of initial points comprising central points of said second blocks, and repeating said steps (d) and (e) for said second set of initial points.

Preferably, the method further includes:

(k) repeating said steps (f) to (h) for said second set of initial points.

Preferably, the method further includes:

(l) successively sub-dividing each of said blocks into further blocks and repeating steps (j) and (k) for said further blocks until the difference between values of distance D3 calculated for successive blocks does not exceed a predetermined value.

Preferably, said transfer function comprises a database of hypothetical source locations, receiver locations and corresponding values of at least one attribute.

Preferably, said step (c) comprises:

(m) applying a matching algorithm to said actual survey data and said set of hypothetical source locations and receiver locations so as to select a subset of said hypothetical source locations and receiver locations and calculating at least one estimated attribute value for each of said source/ receiver pairs, on the basis of transfer function data associated with subset of said hypothetical source locations and receiver locations.

Preferably, said estimated attribute values are calculated by interpolating transfer function data associated with said subset of hypothetical source locations and receiver locations.

Preferably, said at least one attribute includes at least one of: reflection point, deviation between mid-point and reflection point, travel time, amplitude and incidence angle.

In accordance with a second aspect of the invention, there is provided a seismic survey method comprising obtaining a set of seismic survey data for a survey area and analysing said seismic survey data using a method in accordance with the first aspect of the invention.

In accordance with a third aspect of the invention, there is provided a computer program or a suite of computer programs adapted to execute the method in accordance with the first aspect of the invention.

In accordance with a fourth aspect of the invention, there is provided a data processing system adapted to execute one or more computer programs in accordance with the third aspect of the invention.

In accordance with a fifth aspect of the invention, there is provided a data carrier encoded with one or more computer programs in accordance with the third aspect of the invention.

Embodiments of the invention will now be described, by way of example only, with reference to the accompanying drawings, in which.

The systems and methods of the present invention involve a two stage methodology, a first "model processing" stage and a second "ray matching" procedure.

Referring firstly to model processing, the type of subsurface model is chosen to optimise computational speed. Preferably, this comprises a layered model, with fully defined boundaries between the layers. Such a model defines the three-dimensional structure of the geology in terms of layers, boundaries between layers, and outermost surface and subsurface boundaries. The boundaries are defined by a plurality of faces and each face by a plurality of polygons, suitably triangles.

The model further defines the properties of the layers and boundary faces which determine the path of a ray passing through the structure. Typically, a boundary face will be reflective, refractive, absorbent or have a "conversion" property (reflection/refraction with a change of wave type). The model further defines a pressure wave velocity profile for each layer, which may be, for example, a constant velocity or a velocity which varies linearly as a function of depth, or a velocity which varies in some other manner. Shear wave velocity profiles may also be defined, possibly comprising a function of the pressure wave velocity. Density profiles may also be defined for layers. Where the reflection/refraction/ absorption properties of a face are unknown, the effect of the face on a ray may be calculated on the basis of the impedance of the adjacent layers, which in turn may be derived from the velocity and density parameters of the layers.

Using a model of this type, the calculation of a ray path through the model is quite straightforward. Given a starting (shot) location (normally but not necessarily on the surface of the model) and direction (typically defined by the offset and azimuth angles α and β), it is possible to determine the point at which the ray will intersect the next boundary. After hitting a boundary face, the next direction of the ray may be determined from the properties of the face and/or adjacent layers and the point of intersection with the next boundary face may be determined, this process being repeated until the ray exits the model through one of the outermost boundaries. The parameters defined by the model also allow travel times and/or signal amplitudes and/or other attributes to be calculated.

Travel times can be calculated in a straightforward manner based on the parameters of the model. Changes in signal amplitude (attenuation) can also be calculated.

Figure 1:
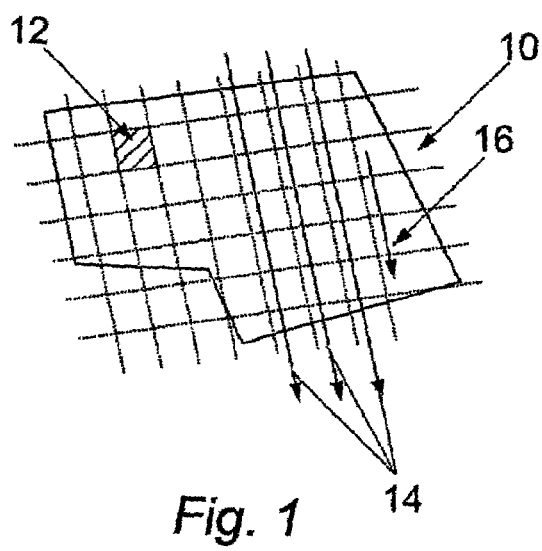
FIG. 1 is a schematic plan view illustrating the basic methodology of a seismic survey operation.
Figure 2:
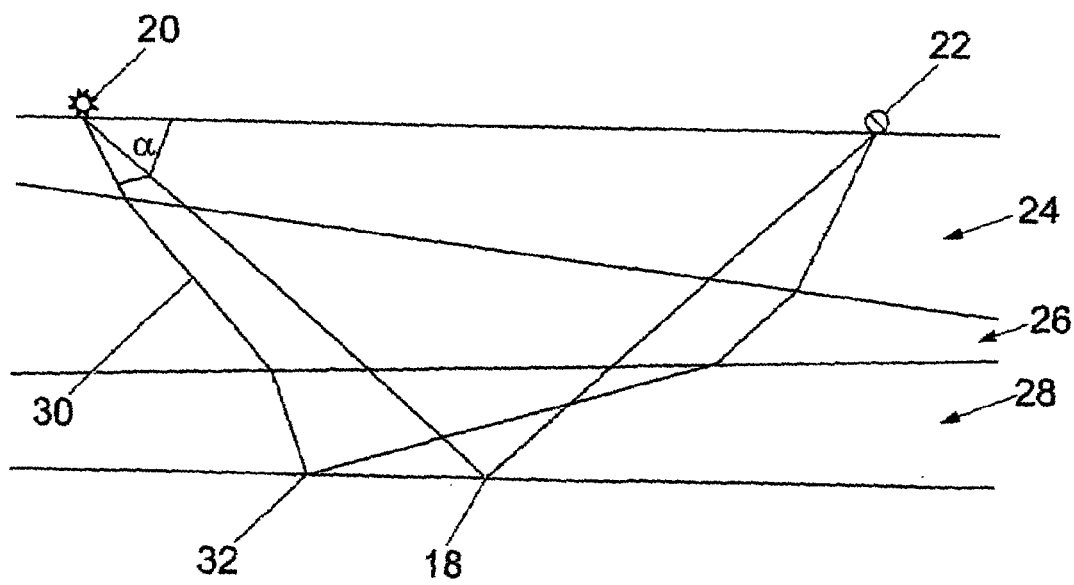
FIG. 2 is a schematic, sectional side view of a geological structure illustrating the propagation of energy between a shot source and a receiver.
Figure 3:
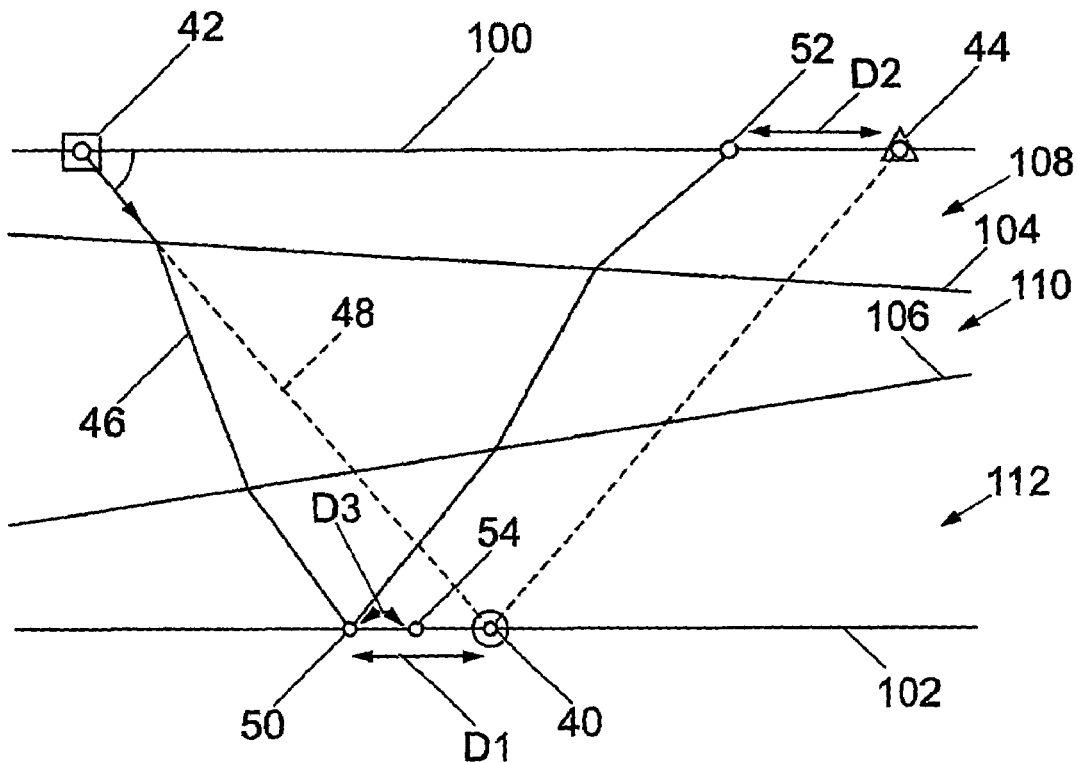
FIG. 3 is a first diagram illustrating the manner in which a transfer function for a geological model is derived in accordance with one embodiment of the invention.

The model is used to generate a database of ray paths between a plurality of shot locations and receiver positions. This database effectively constitutes a transfer function for the model. The database is generated as follows, with reference to FIG. 3, which illustrates a portion of a simplified example of a geological model having top and bottom boundaries 100 and 102, and inter-layer boundaries 104 and 106 between layers 108, 110 and 112. For present purposes, the bottom boundary 102 is taken as the average depth of the actual bottom boundary of the model. It will be understood that the top boundary 100 will not generally be flat, and height differences between the shot and receiver positions are also taken into account in the calculations described below.

In general, the user will have some prior knowledge regarding the typical offsets and azimuths in a survey (in this context, offset means the distance between a source and a receiver). Most offsets and azimuths will be relatively close to one another. Therefore, rather than computing ray paths for every possible offset/azimuth pair, the user may select a set of typical offsets and azimuths. The system may provide a set of pre-defined templates for this purpose.

A first set of points is selected within the survey area and each of these points is treated as the mid-point (40 in FIG. 3) between the locations of at least one, preferably a plurality, of hypothetical shot-receiver pairs 42/44. The direction from the hypothetical shot location 42 to the mid-point 40 is taken to provide the starting angles for tracing the path 46 of a ray propagating from the shot location 42. If shear wave conversion is used, this initial direction is corrected using a first order approximation. Typically, when the ray strikes the first inter-layer boundary 104, the path 46 will deviate from the notional path 48 between the shot location 42 and the mid-point 40. The propagation path 46 is calculated using ray tracing techniques and the model parameters as described above, in order to determine the reflection point 50 and the emergence point 52 at which the ray exits from the model. In general, the reflection point 50 will be different from the mid-point 40 and the emergence point 52 will be different from the initial hypothetical receiver position 44. The deviation D1 between the initial mid-point 40 and the calculated reflection point 50 may be calculated, as may the deviation D2 between the initial receiver location 44 and the calculated emergence point 52. The actual mid-point 54 between the hypothetical shot location 42 and the emergence point 52 may also be calculated. For the purposes of the present embodiment of the invention, the emergence point 52 and the difference D3 between the calculated reflection point 50 and the actual mid-point 54 are stored. In addition, further attributes such as the travel time and signal amplitudes may be calculated and stored also.

If the emergence point 52 is not sufficiently close to the initial hypothetical receiver position 44, further iterations may be performed to obtain an emergence point that is closer to the receiver position. For every source/receiver pair 42/44 for which the distance D3 between the desired mid-point 40 and the actual mid-point 54 is greater than a predetermined threshold value, several iterations may be performed until D3 is smaller than the threshold value, or a maximum number of iterations is reached. This iterative procedure selects a new hypothetical receiver position 44 (and hence a new mid-point 40 and therefore a new starting direction from the hypothetical source 42 to the new mid-point), based on the difference D3. Preferably, the iterative algorithm is based on the weighted average of previous iterations, and will generally converge within three iterations.

Figure 4:
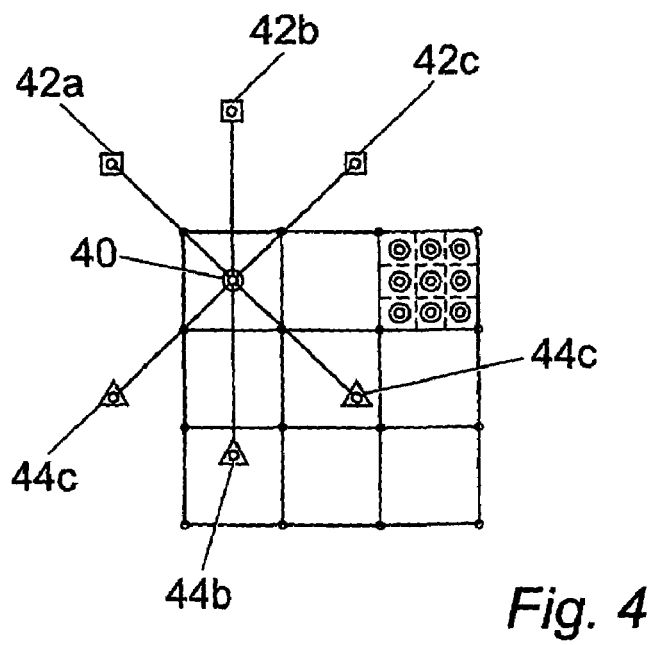
FIG. 4 is a second diagram illustrating the manner in which a transfer function for a geological model is derived in accordance with one embodiment of the invention.

In the preferred embodiment of the invention, the survey area is initially divided into a relatively coarse grid and the set of points selected as the initial mid-points 40 for the hypothetical source/receiver pairs 42/44 are the central points of the blocks of the grid. FIG. 4 illustrates a 3×3 grid. Typically, a 9×9 grid provides a suitable starting grid. For each block of the grid, a plurality of hypothetical source/receiver pairs 42a,b,c/44a,b,c are selected, centred on the mid-point 40. The illustrated example arbitrarily shows three equally spaced source/receiver pairs 45 degrees apart. The actual offsets (distances between sources and receivers) and azimuths of the selected source/receiver pairs will depend on the user's prior knowledge of the intended survey parameters. The number of source/receiver pairs appropriate in a particular case will vary. In general, three or four pairs will be adequate, or about 10% of the anticipated data density in the actual survey data.

For each source/receiver pair of each block of the grid, the iterative process described above is carried out to determine reflection points, emergence points and deviations D3, together with any travel time and amplitude data and/or other attributes such as incidence angle etc.

Next, each block of the grid is sub-divided into smaller blocks, suitably using a 3×3 sub-grid, as shown in the top right block of FIG. 4. The procedure described above in relation to the starting grid is then applied to each block of each sub-grid. This procedure is repeated for successive sub-divisions of each block until the deviations D3 become uniform (within predetermined tolerances) between successive sub-divisions of a particular block. At this point, it is assumed that further iterations will not lead to any significant changes in D3. Uniformity between successive values of D3 may be checked, for each offset/azimuth pair, by comparing the maximum distance between the deviation vectors for each sub-grid with a pre-defined constant. Further, a minimum width for the sub-grid blocks may be specified, so that the recursion stops when the grid-elements reach that minimum value.

It is preferable for the grids to have an odd number of blocks on each side, since this means that the central mid-point of each block of each grid remains constant and does not have to be re-calculated in each successive sub-grid.

The output from this process provides a database of representative source/receiver pairs and corresponding reflection points (and other attributes as required in a particular application), refined to a level of detail that reflects the complexity of the geological model. The database constitutes an empirically derived transfer function of the model. The database suitably has a tree structure reflecting the recursive nature of the process of sub-dividing the sampling grid.

Referring now to the ray matching process, the database of the geological model is used to derive approximate reflection points (and values of other attributes if required) for each shot/receiver pair in a set of actual survey data from the survey area simulated by the model. This is accomplished using some form of matching algorithm. There are a number of possible ray matching methods, based on searching the database for one or more hypothetical source receiver pairs (and corresponding reflection point(s)) and/or mid-points which provide the closest match(es) to the actual source receiver pair and/or mid-point and estimating the reflection point etc. of the actual source receiver pair on the basis thereof.

The preferred ray matching method is based on a two-step interpolation algorithm. The first step involves selecting a set of hypothetical source/receiver pairs from the database which are close to the actual source/receiver pair of interest and analysing the relationships between the offsets and azimuths of the selected source/receiver pairs and the values of the attributes (e.g. the deviation between the mid-point and reflection point, travel time, amplitude, incidence angle, etc.) associated therewith. The second step involves deriving corresponding attribute values for the actual source/receiver pair on the basis of this analysis. The attribute values derived for the actual source/receiver pair are thus obtained by interpolation of the attribute values associated with the selected hypothetical source/receiver pairs.

In the particularly preferred embodiment, this two-step algorithm is implemented as follows.

In the first step, for each actual source/receiver pair, the hypothetical data for each of the four blocks of the database grid closest to the mid-point of the actual source/receiver pair is extracted from the database. For each of these four blocks, a set of interpolated curves is generated, based on the offsets and azimuths (at least one azimuth per offset) of the hypothetical source/receiver pairs. That is, for each attribute the values of the attribute are plotted against the associated offset and an interpolated curve is calculated. If there is more than one azimuth for each offset, there will be an attribute/offset curve for each azimuth. Accordingly, the four grid blocks yield four sets of interpolated curves, each set comprising at least one attribute/offset curve for each attribute. Then, from each of the four sets of curves, a value for each of the attributes can be extracted corresponding to the offset and azimuth of the actual source/receiver pair, yielding four sets of interpolated attribute values (one set per grid block).

Since the actual survey data will generally include a large number of source/receiver pairs with mid-points close to one another, these will all require the same set of interpolated curves to be derived from the database. Rather than searching the database for every actual source/receiver pair, the search and creation of interpolated curves need only be done once per block of the grid.

In the second step, the four sets of interpolated attribute values are spatially interpolated (e.g. based on the distances from the mid-points of the respective grid blocks to the mid-point of the actual source/receiver pair) to obtain a final set of attribute values for the actual source/receiver pair.

That is, the attribute values for the actual source/receiver pairs can be regarded as being calculated on the basis of interpolating transfer function data associated with a selected subset of hypothetical source/receiver pairs.

The method as described above allows attributes such as reflection points, travel times and amplitudes to be easily estimated for each source/receiver pair in a set of actual survey data. The computational burden of ray tracing required to generate the database from which these estimated values are derived can be controlled and limited so as to be much lower than that involved in conventional methods of applying ray tracing to the actual survey data.

The foregoing description of embodiments of the invention relates particularly to land surface based survey operations, employing two-dimensional arrays of source/receiver pairs. The invention may also be adapted for vertical seismic profiling operations in which the sources or receivers are arranged in a linear manner; e.g. along a cable in a borehole. The invention may be similarly adapted for underwater surveys; e.g. where receivers are placed on cables at the ocean bottom. The invention may also be adapted for anisotropic media. The invention further lends itself to parallel processing, which may be applied to the ray tracing calculations, database generation, and database searching.

The methods may be implemented by means of a computer program or a suite of computer programs, which may be encoded on any suitable data carrier and which may be executed by means of any suitable data processing system.

It will be understood that the invention is not limited to the particular embodiments described above. Improvements and modifications may be incorporated without departing from the scope of the invention.

What is claimed is:

1. A method of analyzing seismic survey data, comprising:
   (a) obtaining a numerical model describing the geology of a survey area;
   (b) calculating a transfer function for said model which defines at least one attribute value within said survey area for a set of hypothetical shot source locations and corresponding receiver locations;
      (i) selecting a set of initial points within said survey area and selecting at least one hypothetical source location and a corresponding hypothetical receiver location centered on each of said points;
      (ii) for each of said source locations, calculating the path of a ray through said model originating at said source location and having an initial direction towards said initial point so as to determine a reflection point and an emergence point for said ray;
   (c) comparing a set of actual survey data comprising a plurality of source/receiver pairs with said set of hypothetical source locations and receiver locations, and estimating at least one actual attribute value for each of said source/receiver pairs on the basis of said comparison;
   (d) for each of said source locations, calculating a distance D1 between said initial point and said reflection point, a distance D2 between said hypothetical receiver location and said emergence point, a mid-point between said hypothetical shot location and said emergence point, and a distance D3 between said mid-point and said initial point; and
   (e) where said distance D2 exceeds a predetermined minimum value, selecting a second hypothetical receiver location on the basis of said distance D3 and repeating steps (b)(ii) and (d) for said second hypothetical receiver location.

2. A method as claimed in claim 1, wherein:
   (f) where a new value of D3 calculated in step (e) remains greater than said predetermined minimum value, the method includes performing further iterations of step (e) in which further hypothetical receiver locations are selected based on a weighted average of the distance D3 obtained in previous iterations until a value of distance D3 is obtained which does not exceed said predetermined value.

3. A method as claimed in claim 2, wherein the method further includes:
(g) dividing said survey area into a plurality of first blocks, said initial points selected in step (b)(i) comprising central points of said first blocks.

4. A method as claimed in claim 3, wherein the method further includes:
(h) sub-dividing each of said first blocks into a plurality of second blocks, selecting a second set of initial points comprising central points of said second blocks, and repeating said steps (b)(i) and (b)(ii) for said second set of initial points.

5. A method as claimed in claim 4, wherein the method further includes:
(i) repeating said steps (d) to (f) for said second set of initial points.

6. A method as claimed in claim 5, wherein the method further includes:
(j) successively sub-dividing each of said blocks into further blocks and repeating steps (h) and (i) for said further blocks until the difference between values of distance D3 calculated for successive blocks does not exceed a predetermined value.

7. A method as claimed in claim 1, wherein said transfer function comprises a database of hypothetical source locations, receiver locations and corresponding values of at least one attribute.

8. A method as claimed in claim 1, wherein said step (c) comprises:
(k) applying a matching algorithm to said actual survey data and said set of hypothetical source locations and receiver locations so as to select a subset of said hypothetical source locations and receiver locations and calculating at least one estimated attribute value for each of said source/receiver pairs, on the basis of transfer function data associated with said subset of said hypothetical source locations and receiver locations.

9. A method as claimed in claim 8, wherein said estimated attribute values are calculated by interpolating transfer function data associated with said subset of hypothetical source locations and receiver locations.

10. A method as claimed in claim 1, wherein said at least one attribute includes-at least one of: reflection point, deviation between mid-point and reflection point, travel time, amplitude and incidence angle.

11. A seismic survey method comprising obtaining a set of seismic survey data for a survey area and analysing said seismic survey data using a method as claimed in claim 1.

12. A computer program or a suite of computer programs adapted to execute a method as claimed in claim 1.

13. A data processing system adapted to execute one or more computer programs as claimed in claim 12.

14. A data carrier encoded with one or more computer programs as claimed in claim 12.

* * * * *